United States Patent
Miyamoto

(10) Patent No.: US 9,712,103 B2
(45) Date of Patent: Jul. 18, 2017

(54) ACTUATOR CONTROLLER AND ACTUATOR CONTROL METHOD

(71) Applicant: HITACHI AUTOMOTIVE SYSTEMS, LTD., Hitachinaka-shi, Ibaraki (JP)

(72) Inventor: Shogo Miyamoto, Isesaki (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 0 days.

(21) Appl. No.: 15/117,303

(22) PCT Filed: Sep. 19, 2014

(86) PCT No.: PCT/JP2014/074952
§ 371 (c)(1),
(2) Date: Aug. 8, 2016

(87) PCT Pub. No.: WO2015/125330
PCT Pub. Date: Aug. 27, 2015

(65) Prior Publication Data
US 2016/0352280 A1    Dec. 1, 2016

(30) Foreign Application Priority Data
Feb. 21, 2014 (JP) ................. 2014-032199

(51) Int. Cl.
*H02P 6/00* (2016.01)
*H02P 29/66* (2016.01)
(Continued)

(52) U.S. Cl.
CPC ............ *H02P 29/66* (2016.02); *F04B 17/03* (2013.01); *F04B 49/02* (2013.01);
(Continued)

(58) Field of Classification Search
CPC .. H02P 29/64; H02P 29/66; H02P 6/08; F16H 61/0025; F04B 2203/0201;
(Continued)

(56) References Cited

U.S. PATENT DOCUMENTS

| | | | |
|---|---|---|---|
| 2003/0051679 A1* | 3/2003 | Iwata | B60K 6/24 123/41.31 |
| 2008/0129237 A1* | 6/2008 | Atarashi | H02P 6/00 318/492 |

(Continued)

FOREIGN PATENT DOCUMENTS

| | | |
|---|---|---|
| JP | 11-287316 A | 10/1999 |
| JP | 2007-104855 A | 4/2007 |

(Continued)

*Primary Examiner* — Eduardo Colon Santana
*Assistant Examiner* — Gabriel Agared
(74) *Attorney, Agent, or Firm* — Foley & Lardner LLP

(57) ABSTRACT

The controller for an actuator that is driven by a brushless motor estimates the temperature of the magnet in the brushless motor on the basis of an electric current value and a rotation speed thereof which are obtained by supplying power to rotate the brushless motor in a reverse direction, and limits current flowing through the brushless motor during forward rotation so as to prevent the magnet temperature from rising beyond an allowable maximum temperature. Limiting the current flowing through the brushless motor on the basis of the estimated magnet temperature makes it possible to drive the brushless motor while preventing the magnet temperature from rising beyond the allowable maximum temperature without providing the brushless motor with any temperature sensor for detecting the magnet temperature therein.

14 Claims, 10 Drawing Sheets

(51) Int. Cl.
*H02P 6/08* (2016.01)
*F04B 17/03* (2006.01)
*F04B 49/02* (2006.01)
*F16H 61/00* (2006.01)

(52) U.S. Cl.
CPC ........... *F16H 61/0025* (2013.01); *H02P 6/08* (2013.01); *H02P 29/662* (2016.11); *F04B 2203/0201* (2013.01); *F04B 2203/0205* (2013.01); *F04B 2203/0209* (2013.01)

(58) Field of Classification Search
CPC .. F04B 2203/0209; F04B 17/03; F04B 49/02; F04B 2203/0205
USPC .................................................... 318/400.01
See application file for complete search history.

(56) References Cited

U.S. PATENT DOCUMENTS

| | | | |
|---|---|---|---|
| 2011/0234133 A1* | 9/2011 | Hano | ..................... H02P 6/182 318/400.21 |
| 2012/0062164 A1* | 3/2012 | Sano | ................... F16H 61/0031 318/721 |
| 2012/0108385 A1* | 5/2012 | Sano | ........................ B60K 6/48 477/5 |

FOREIGN PATENT DOCUMENTS

| | | |
|---|---|---|
| JP | 2007-259586 A | 10/2007 |
| JP | 2010-200515 A | 10/2007 |
| JP | 2012-096659 A | 5/2012 |
| JP | 2013-110804 A | 6/2013 |
| JP | 2013-151257 A | 8/2013 |

* cited by examiner

CHARACTERISTICS OF TEMPERATURE RISE (WHILE BEING DRIVEN)

CHARACTERISTICS OF TEMPERATURE FALL AND RISE (AROUND DRIVE RESTART)

ACTUATOR CONTROLLER AND ACTUATOR CONTROL METHOD

TECHNICAL FIELD

The present invention relates to a controller and a control method for an actuator that is driven by a brushless motor.

BACKGROUND ART

There is a demand for size, weight and power-consumption reductions in electric actuators used in vehicles such as automobiles. To meet such a demand, such an electric actuator includes a highly efficient, high-performance brushless motor using a rare earth magnet. The rare earth magnet is known to be irreversibly demagnetized when the surrounding temperature rises beyond a predetermined value, which immediately and seriously degrades the performance of the motor. To avoid such demagnetization, a motor for driving a vehicle such as an electric vehicle (EV) or a hybrid vehicle (HEV) is provided with a temperature sensor, and controlled on the basis of its status monitored with the temperature sensor.

Unlike this vehicle drive motor, however, providing any temperature sensor might not be allowed in a motor for driving vehicle accessories such, for example, as a motor driving an electric oil pump for transmission's idle reduction (I/R) since there are layout and cost constraints in such a motor.

To address this, Patent Document 1 discloses the following method for controlling a motor for driving an electric oil pump. In the method, first, the temperature of a magnet in the motor at a time point, while the motor is driving the electric oil pump, is estimated from the current oil temperature with magnet temperature rises by heat generation (calculated with the torque and the rotation speed of the motor) of the motor being added on. Then, the output torque of the motor is limited and the minimum rotational speed is lowered in accordance with the estimated magnet temperature.

Meanwhile, the technique disclosed in Patent Document 2 addresses the above by the following method. First, at a time point when the rotation speed of the motor becomes equal to or more than a predetermined value while the motor is being driven, the magnetic force (magnet temperature) in the motor is estimated from the electromotive force and the rotation speed of the motor. Then, when the magnet is determined to be demagnetized on the basis of the estimated magnetic force, the timing of supplying the current to the motor is changed.

REFERENCE DOCUMENT LIST

Patent Documents

[Patent Document 1] JP A 2012-96659
[Patent Document 2] JP A 2013-110804

SUMMARY OF THE INVENTION

Problems To Be Solved By The Invention

The technique disclosed in Patent Document 1 uses, as the initial value of the magnet temperature, the oil temperature measured at the time of estimation. However, this technique involves the risk of failing to avoid demagnetization. This is because the relation of "magnet temperature>oil temperature" is tend to establish at the restart of the operation (the second or subsequent time of operation) of the electric oil pump since the motor is still hot at that restart. For example, when the activation and deactivation of the electric oil pump are alternately repeated at short time intervals in a vehicle with an idle reduction (I/R) function, the amount of heat from the motor during the interval is sometimes more than to balance the heat release from the oil, leading to estimation error of the magnet temperature. Moreover, the technique disclosed in Patent Document 1 limits the output of the motor to avoid demagnetization. Thus, applying this technique to idle reduction might cause insufficient oil pressure in the electric oil pump, which causes shock upon clutch engagement and/or a delay at the start of the vehicle.

In the technique disclosed in Patent Document 2, a time delay may occur from when the motor reaches the predetermined rotation speed to when the estimation of the magnet temperature is started. Moreover, the drive command value sometimes prevents the motor from reaching the predetermined rotation speed. Accordingly, the technique involves the risk of failing to estimate the magnet temperature reliably under the intended conditions and timing. In addition, the technique addresses the case where the magnet is demagnetized, but provides no measure to avoid demagnetization.

The present invention has been made in view of the above circumstances, and an object thereof is to provide an actuator controller and an actuator control method for appropriately driving a brushless motor without providing a temperature sensor thereto.

Means for Solving the Problems

The actuator controller according to the present invention is for an actuator that is driven by a brushless motor for driving an electric oil pump. According to a temperature of a magnet in the brushless motor estimated on the basis of a saturation rotation speed and a phase current value during saturation rotation of the brushless motor which are obtained by supplying power thereto while the electric oil pump is caused to run idle with oil drained out of an oil pipe by rotating the brushless motor in a direction reversal of a rotational direction thereof for driving the actuator, the actuator controller limits current flowing through the brushless motor while the brushless motor is driving the actuator.

The actuator control method according to the present invention is for controlling an actuator that is driven by a brushless motor for driving an electric oil pump. The actuator control method comprises the steps of: rotating the brushless motor in a direction reversal of a rotational direction thereof for driving the actuator; supplying power to the brushless motor while the electric oil pump is running idle with oil drained out of an oil pipe; and limiting current flowing through the brushless motor while the brushless motor is driving the actuator, according to a temperature of a magnet in the brushless motor estimated on the basis of a saturation rotation speed and a phase current value during saturation rotation of the brushless motor which are obtained by performing the step of supplying power.

Effects of the Invention

According to the present invention, on the basis of the electric current value and the rotation speed of the brushless motor which are obtained by supplying power thereto in the operation mode in which the brushless motor operates without creating any load for causing the actuator to operate, the actuator controller limits current flowing through the brushless motor while the brushless motor is driving the actuator. This makes it possible to appropriately drive the brushless motor without providing a temperature sensor thereto.

MODE FOR CARRYING OUT THE INVENTION

Hereinafter, an embodiment of the present invention will be described with reference to the drawings.

Figure 1:
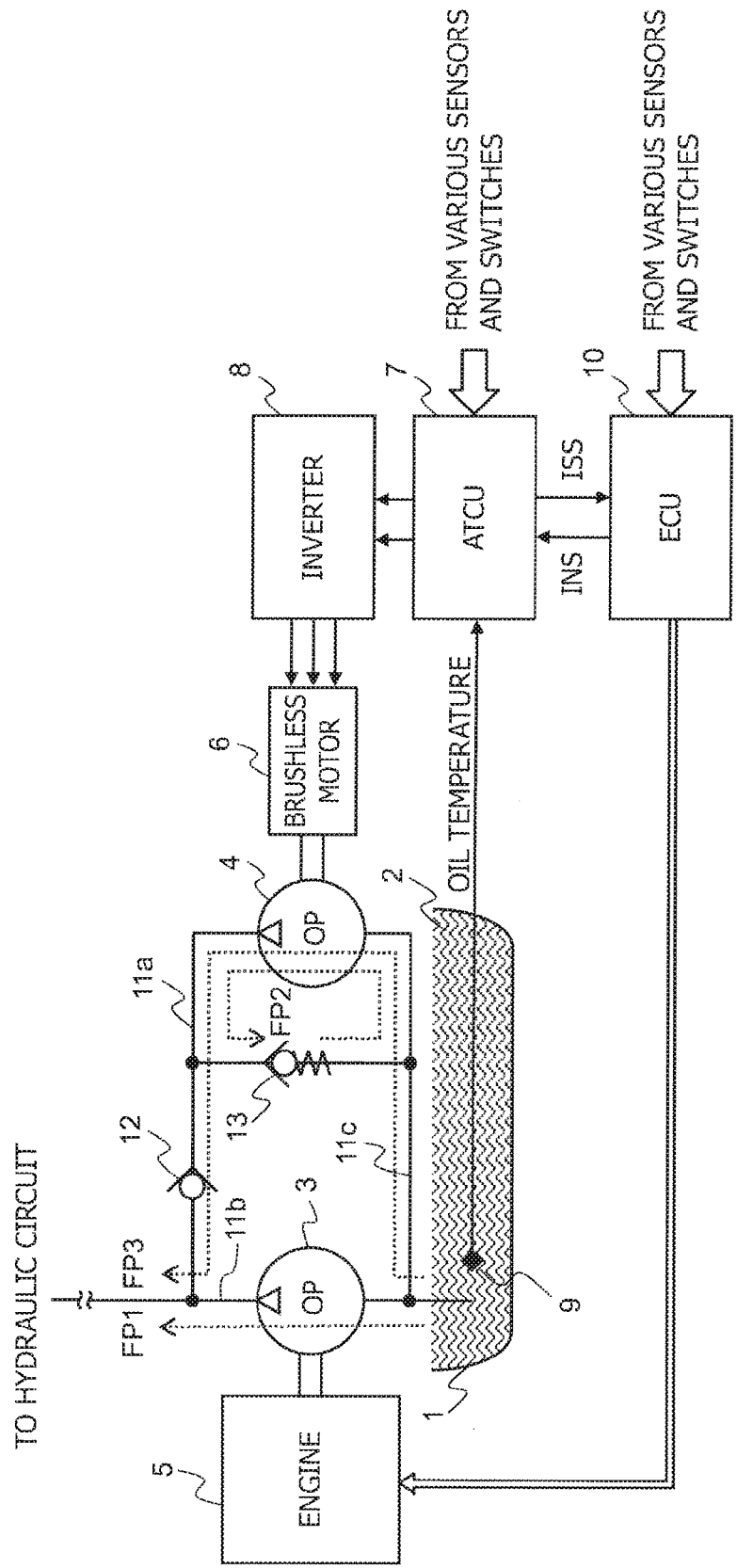
FIG. 1 schematically illustrates the configuration of an actuator controller according to an embodiment of the present invention.

FIG. 1 schematically illustrates the configuration of an actuator controller according to an embodiment of the present invention. FIG. 1 includes the main components of a transmission oil pump system, which is an example of an actuator for driving vehicle accessories. The transmission oil pump system is configured to supply oil 2 stored in an oil pan 1 to a hydraulic circuit for a transmission. The transmission oil pump system includes a mechanical oil pump 3 and an electric oil pump 4. Mechanical oil pump 3 is driven by an engine 5, while electric oil pump 4 is driven by a brushless motor 6. The oil 2 in oil pan 1 is pumped to the hydraulic circuit by mechanical oil pump 3 while engine 5 is rotating, and by electric oil pump 4 during idle reduction.

Brushless motor 6 is coupled directly to electric oil pump 4, and controlled by a vehicle AT control unit (automatic transmission control unit: ATCU) 7 by way of an inverter 8. An oil temperature sensor 9, which measures the temperature of the oil 2 in oil pan 1, supplies ATCU 7 a signal indicating the oil temperature. In addition, various sensors and switches supply ATCU 7 with signals for determining whether to permit idle reduction. Such signals include signals indicating vehicle and engine speeds, an accelerator position, a brake switch status, a steering angle and a water temperature. ATCU 7 determines whether idle reduction is expected on the basis of these signals before idle reduction is actually started.

From various sensors and switches, an electronic control unit (ECU) 10 is provided with signals indicating the detected status of engine 5, or the detected status of the driving, braking and steering systems of the vehicle. ECU 10 calculates the optimum values of parameters such as a fuel injection amount, fuel injection timing, ignition timing and an idle engine speed according to the status of engine 5. Based on the thus calculated values, ECU 10 controls engine 5 by transmitting control commands to a fuel injection device and an ignition device. ECU 10 is a higher-level unit of ATCU 7, and ECU 10 and ATCU 7 control engine 5 in conjunction with each other. During idle reduction, ATCU 7 transmits an idle reduction cancel signal ISS to ECU 10 before the electric oil pump stops. Requests from ECU 10 are prioritized over requests from ATCU 7. Examples of the requests from ECU 10 include those regarding the status of engine 5 and the vehicle safety. The restriction that ATCU 7 imposes to limit power supply to brushless motor 6 is cancelled in response to a cancel request signal INS transmitted by ECU 10.

An oil pipe 11a, which connects mechanical oil pump 3 and electric oil pump 4, is provided with a check valve 12 for blocking the oil 2 from flowing from mechanical oil pump 3 toward electric oil pump 4. In addition, in parallel to electric oil pump 4, a check valve 13 is provided for blocking the oil 2 from flowing from the intake side of electric oil pump 4 toward the discharge side thereof.

During normal drive of the vehicle, that is, while engine 5 is rotating, mechanical oil pump 3 is driven in conjunction with engine 5. Thereby, mechanical oil pump 3 pumps the oil 2 out of oil pan 1 to the hydraulic circuit through an oil pipe 11b as indicated by dotted arrow FP1 so as, for example, to lubricate and cool the unillustrated transmission. The oil 2 returns to oil pan 1 after flowing through the hydraulic circuit, and continues to circulate as indicated by dotted arrow FP1. In this event, check valve 12 blocks the oil 2 from flowing toward electric oil pump 4.

When determining that idle reduction is expected, ATCU 7 firstly drives, by way of inverter 8, brushless motor 6 to rotate in a direction reversal of the normal rotational direction (This is a rotational direction that creates a load for causing the actuator to operate, that is, a rotational direction that causes electric oil pump 4 to pump the oil 2 to the hydraulic circuit. The normal rotational direction will be referred herein to as the forward (rotational) direction). While brushless motor 6 is in reverse rotation, the intake and the discharge of electric oil pump 4 are switched from each other. This causes the negative pressure in oil pipe 11a, and causes check valves 12 and 13 to block the oil 2 from flowing therethrough.

As a result, the oil 2 is drained out of oil pipe 11a. This causes electric oil pump 4 to run idle, which means that electric oil pump 4 operates in such an operation mode as to create no load for causing the actuator to operate. Based on the value of current (phase current) flowing through brushless motor 6 and its rotation speed (saturation rotation speed) while electric oil pump 4 is running idle, ATCU 7 estimates the temperature of the magnet in brushless motor 6. Then, from this estimated magnet temperature, ATCU 7 calculates a control variable for brushless motor 6. The range of estimate of magnet temperature is from the minimum temperature at which the oil 2 is guaranteed to properly function to the maximum temperature at which the rare earth magnet in brushless motor 6 is not demagnetized by heat. The heat demagnetization occurs at 150° C. or higher, for example. While the magnet temperature is estimated by using idle running of electric oil pump 4, brushless motor 6 is driven at low load, thus consuming low current with minimum heat generation.

Then, while mechanical oil pump 3 is operating, ATCU 7 transmits a motor activation command to inverter 8. In response, inverter 8 drives brushless motor 6 to rotate in the forward direction. Thereby, electric oil pump 4 rotates to gradually increase the oil pressure in oil pipe 11*a*, thereby going standby. Under the conditions, the oil pressure in oil pipe 11*b* is higher than in oil pipe 11*a*. Thus, check valve 12 blocks the oil 2 from flowing from oil pipe 11*a* to oil pipe 11*b*. As a result, the oil 2 circulates through oil pipe 11*a*, check valve 13, oil pipe 11C and electric oil pump 4 in this order (see dotted arrow FP2).

During the transition to idle reduction, the rotation speed of engine 5 decreases. Thereby, the rotation speed of mechanical pump 3 also decreases, which causes a reduction in oil pressure in oil pipe 11*b*. When the oil pressure in electric oil pump 4 becomes higher than a predetermined threshold, check valve 12 opens. Thereby, electric oil pump 4 pumps the oil 2 out of oil pan 1 to hydraulic circuit through oil pipe 11C, electric oil pump 4, oil pipe 11*a*, check valve 12 and oil pipe 11*b* as indicated by dotted arrow FP3 so as, for example, to lubricate and cool the transmission. In this case as well, the oil 2 returns to oil pan 1 after flowing through the hydraulic circuit, and continues to circulate as indicated by dotted arrow FP3.

When driving electric oil pump 4, brushless motor 6 is controlled with the control variable calculated by ATCU 7. The control variable is set so as to limit the current flowing through brushless motor 6 to keep the temperature of brushless motor 6 within a range that does not cause irreversible demagnetization of the magnet therein. Such current limitation is made by reducing the duration of driving brushless motor 6, for example. That control allows the appropriate drive of brushless motor 6 by preventing or reducing performance degradation due to demagnetization.

When idle reduction ends, ATCU 7 transmits the idle reduction cancel signal ISS to ECU 10 before electric oil pump 4 stops. In response, ECU 10 performs control to activate engine 5. Thereafter, ATCU 7 transmits a motor stop command to inverter 8. In response, inverter 8 stops driving brushless motor 6 so as to stop electric oil pump 4. Then, engine 5 resumes the normal operation, so that mechanical oil pump 3 pumps the oil 2 out of oil pan 1 to the hydraulic circuit through oil pipe 11*b* as indicated by dotted arrow FP1 so as, for example, to lubricate and cool the transmission. The oil 2 returns to oil pan 1 after flowing through the hydraulic circuit, and continues to circulate as indicated by dotted arrow FP1.

Figure 2:
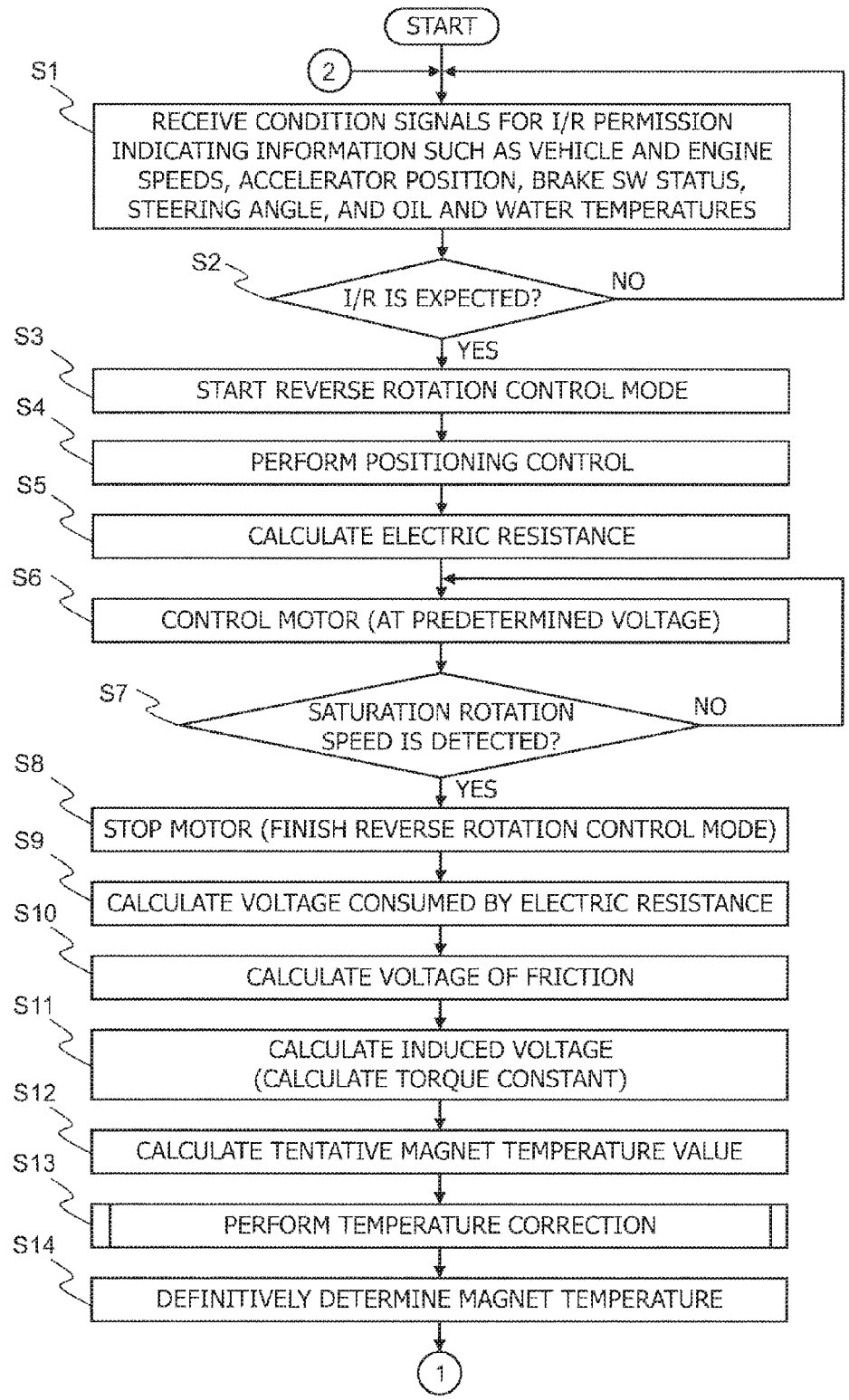
FIG. 2 is a flowchart illustrating estimation operation of the temperature of a magnet in a brushless motor in the controller illustrated in FIG. 1.

Next, the operation of the controller configured as above will be described in detail with reference to the flowcharts of FIGS. 2 to 4. FIG. 2 illustrates calculation operation (estimation operation) of the temperature of the magnet in brushless motor 6 performed by ATCU 7. During normal drive of the vehicle, ATCU 7 receives, from various sensors and switches, condition signals for idle reduction permission. Such signals include signals indicating vehicle and engine speeds, an accelerator position, a brake switch status, a steering angle, and oil and water temperatures, for example (step S1). Based on these signals and the status of the switches, ATCU 7 determines whether idle reduction (I/R) is expected (step S2). For example, ATCU 7 determines that idle reduction is expected when the following conditions are met: Water and oil temperatures are equal to or more than predetermined values therefor; The brake pedal is pressed down with the accelerator released; The vehicle speed is gradually reduced but not zero. When not determining that idle reduction is expected, ATCU 7 repeats the operation in steps S1 and S2.

When determining that idle reduction is expected in step S2, ATCU 7 starts a reverse rotation control mode before transitioning to idle reduction (step S3). In the reverse rotation control mode, ATCU 7 performs the following operations: calculates the resistance of brushless motor 6 while performing positioning control for brushless motor 6; controls brushless motor 6 by applying thereto a set voltage so that brushless motor 6 rotates in the reverse direction; estimates a magnet temperature based on a saturation rotation speed and a phase current value during saturation rotation.

In other words, before activating brushless motor 6, ATCU 7 performs positioning control for a so-called rotor (step S4). In this rotor positioning control, which is performed in order to reliably detect the position of the magnetic pole of the rotor at the start of brushless motor 6, ATCU 7 slightly rotates the rotor in the reverse direction so that the magnetic pole of the rotor is moved to a predetermined point. At the same time, ATCU 7 calculates the electric resistance Rp of brushless motor 6 on the basis of the relation between the current Ip and the voltage Vp (average voltage value for a predetermined time period) supplied to brushless motor 6 just before synchronization (step S5). The resistance Rp may be calculated from "Rp=Vp/Ip."

Subsequently, ATCU 7 controls brushless motor 6 by way of inverter 8 so as to drive brushless motor 6 to rotate in the reverse direction. In this reverse rotation drive, ATCU 7 applies a predetermined voltage Vr to brushless motor 6 (step S6), and determines whether ATCU 7 detects the saturation rotation speed Sa (step S7). The voltage Vr is set to an average value of voltages over a predetermined time period that are required to drive brushless motor 6 to rotate at the saturation rotation speed Sa. ATCU 7 repeats the control of brushless motor 6 in step S6 until detecting the saturation rotation speed Sa. When detecting the saturation rotation speed Sa, ATCU 7 ends the reverse rotation control mode by stopping brushless motor 6 (step S8). At the same time, ATCU 7 calculates a value of phase current Is flowing through brushless motor 6 that rotates at the saturation rotation speed Sa. ATCU 7 calculates the value of the phase current Is by converting a power supply current value into a phase current value (effective value). However, if including a circuit or a sensor capable of directly detecting a phase current value, the actuator controller will not require such conversion.

Figure 5:
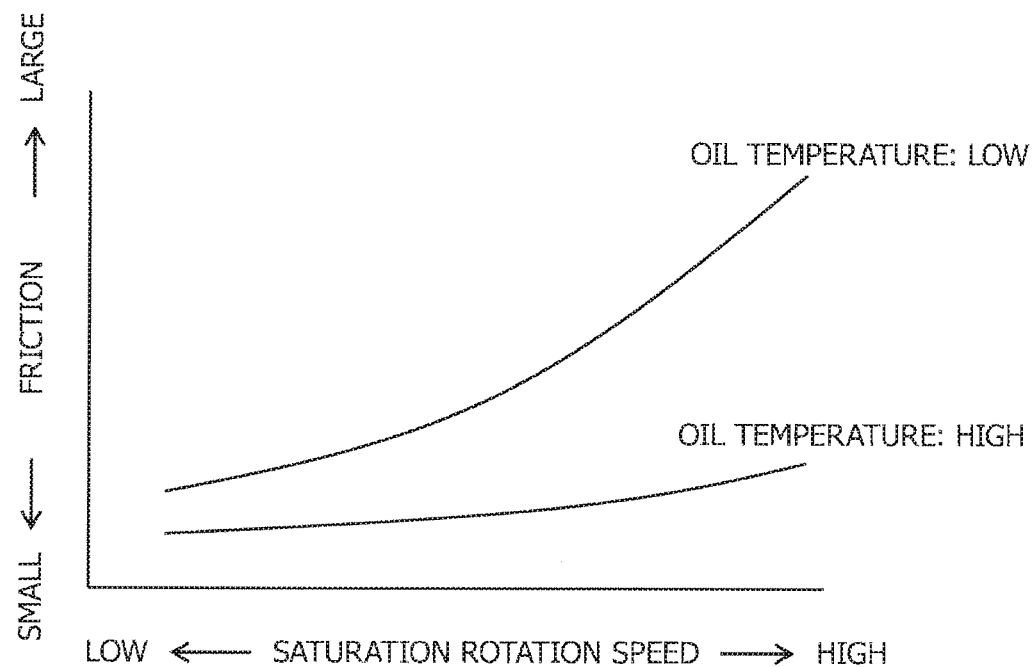
FIG. 5 is a characteristics chart displaying the relation between the rotation speed of the brushless motor and friction.

In the next step S9, from the values of the phase current Is and the above-described resistance Rp of brushless motor 6, ATCU 7 calculates voltage Vs consumed by resistance. The voltage Vs may be calculated from "Vs=Is×Rp." In the subsequent step S10, ATCU 7 calculates voltage Vf of friction. The friction characteristics of brushless motor 6 relative to its rotation speed depend on the oil temperature as illustrated in the characteristics chart of FIG. 5. As displayed in FIG. 5, as the rotation speed increases, the friction increases at a greater rate at a high oil temperature than at a low oil temperature. Accordingly, ATCU 7 calculates the friction F from the oil temperature and the saturation rotation speed Sa either by using the formula describing such friction characteristics relative to the oil temperature and the rotation speed or by using a map that contains these friction characteristics. Based on the calculated friction F, ATCU 7 then calculates the voltage Vf of friction. The voltage Vf may be calculated from the angular velocity, the saturation rotation speed Sa, the friction F and the phase current Is. The voltage Vf may be calculated by dividing the value of "2π/60×Sa×F" by the value of the phase current Is flowing during saturation rotation. Thus, the voltage Vf may be expressed by "Vf=(2π/60×Sa×F)/Is."

Figure 6:
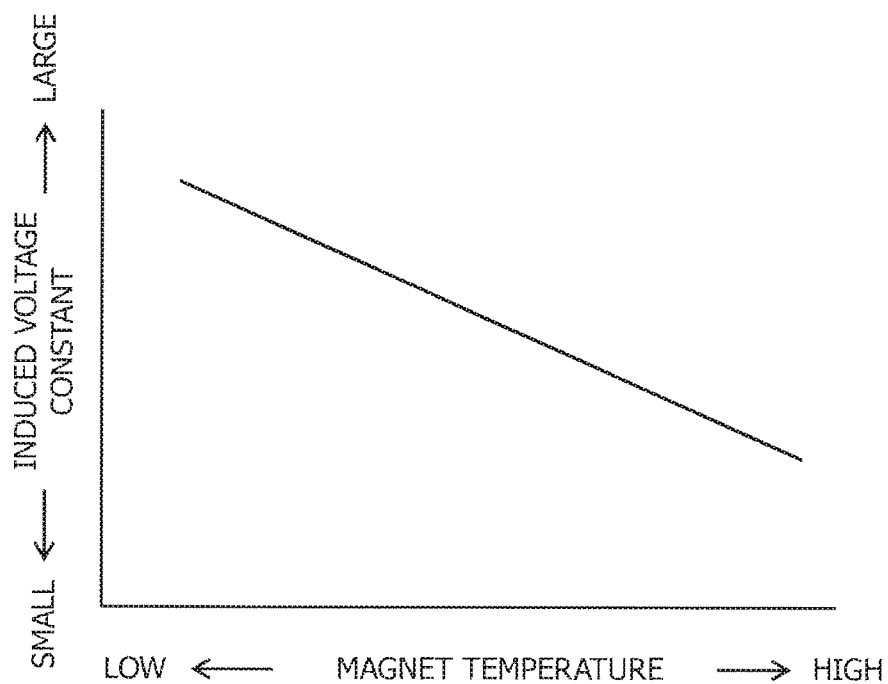
FIG. 6 is a characteristics chart displaying the relation between the magnet temperature in the brushless motor and the induced voltage constant.

In step S11, ATCU 7 calculates induced voltage. The characteristics chart of FIG. 6 illustrates the relation between the magnet temperature and the induced voltage constant (torque constant). As illustrated in FIG. 6, the induced voltage constant is inversely proportional to the magnet temperature, so that the magnet temperature may be estimated on the basis of a decrease in the induced voltage constant. The induced voltage constant Kv may be expressed by Kv=(Vr−Vs−Vf)/Sa. In step S12, ATCU 7 calculates a tentative magnet temperature value. The tentative magnet temperature value may be estimated by, for example, using a map that contains the magnet-temperature characteristics relative to the induced voltage constant Kv.

ATCU 7 performs temperature correction by correcting the tentative magnet temperature value with a learned value (step S13), and definitively determines the magnet temperature through calculation (step S14). In this way, ATCU 7 estimates the magnet temperature, thus eliminating the need for providing any temperature sensor to brushless motor 6.

Figure 3:
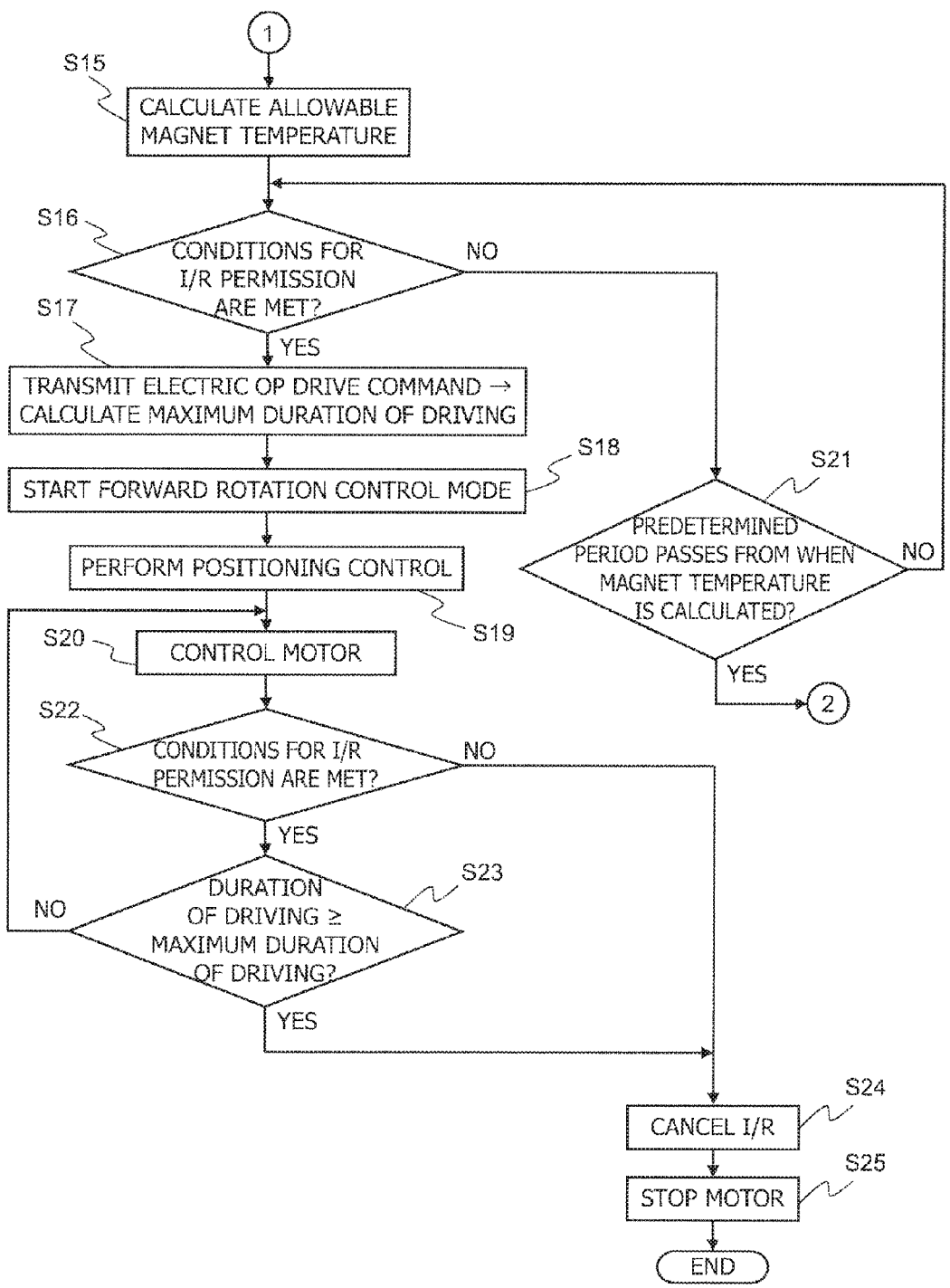
FIG. 3 is a flowchart illustrating control operation performed after definitively determining the magnet temperature in the controller illustrated in FIG. 1.

FIG. 3 illustrates control operation that ATCU 7 performs after definitively determining the magnet temperature. First, ATCU 7 calculates an allowable maximum magnet temperature (step S15), and determines whether the conditions for idle reduction permission are met (step S16). Examples of the conditions for idle reduction permission include: The vehicle speed is 0 km/h; The engine is rotating at a low speed or is idling; The accelerator is released; The brake is switched on; The steering stops moving; Oil and water temperatures are equal to or more than predetermined values therefor.

When the conditions for idle reduction permission are met, ATCU 7 transmits a command to drive electric oil pump 4, and calculates the maximum duration of driving brushless motor 6, which is the control variable therefor (step S17). Then, ATCU 7 starts a forward rotation control mode for brushless motor 6 (step S18). In this mode, ATCU 7 first performs the positioning control for brushless motor 6 by slightly rotating brushless motor 6 in the forward direction (step S19), and then performs control to rotate brushless motor 6 in the forward direction (step S20).

On the other hand, when determining that the conditions for idle reduction permission are not met in step S16, ATCU 7 determines whether a predetermined period of time passes from when the magnet temperature is calculated (step S21). When determining that the predetermined time passes, ATCU 7 returns to step S1 of FIG. 2. When determining that the predetermined time does not pass, ATCU 7 returns to step S16 to determine whether the conditions for idle reduction permission are met. ATCU 7 repeats the operation in steps S16 and S21 until the predetermined time passes.

Figure 7:
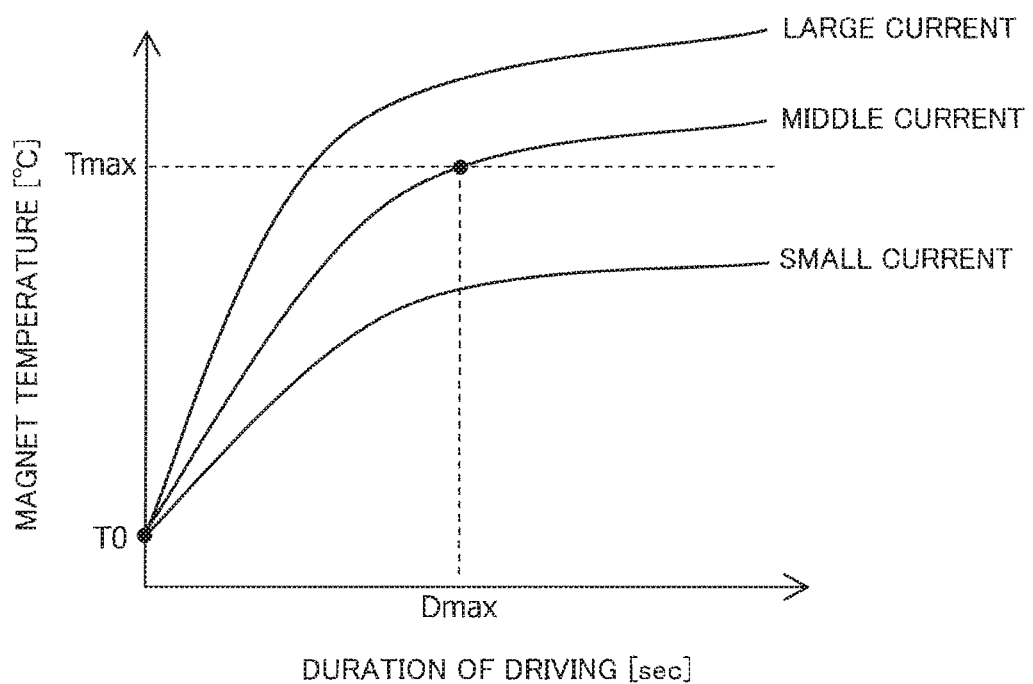
FIG. 7 is a characteristics chart displaying the relation between the duration of driving the brushless motor and the magnet temperature which change in accordance with the value of current supplied to the brushless motor.

In step S22, ATCU 7 determines whether the conditions for idle reduction permission are met. When determining that the conditions for idle reduction permission are met, ATCU 7 then determines whether the duration of driving is not less than the maximum duration of driving (control variable) (step S23). The relation between the duration of driving and the magnet temperature is as illustrated in the characteristics chart of FIG. 7. Assume here that the initial value of the estimated magnet temperature is T0. When a small current flows through brushless motor 6, the magnet temperature does not reach its allowable upper limit (allowable maximum magnet temperature) Tmax, which is indicated by dotted line of FIG. 7. However, when a larger current (middle current or large current) flows through brushless motor 6, the magnet temperature goes beyond the allowable upper limit Tmax. Moreover, as the current increases, the duration of driving brushless motor 6 before the magnet temperature reaches the allowable upper limit Tmax decreases. This relationship allows ATCU 7 to estimate whether the magnet temperature reaches the allowable upper limit Tmax on the basis of the value of the current flowing through brushless motor 6 and the duration of driving thereof. The duration of driving till when the magnet temperature reaches the allowable upper limit Tmax will be referred to as maximum duration of driving Dmax.

When determining that the duration of driving is not less than the maximum duration of driving Dmax in step S23, ATCU 7 transmits the idle reduction cancel signal ISS to ECU 10 before electric oil pump 4 stops, and ECU 10 performs control to activate engine 5, thereby cancelling idle reduction (step S24). In step S25, ATCU 7 transmits the motor stop command to inverter 8, and, in response, inverter 8 stops driving brushless motor 6 so as to stop electric oil pump 4.

When ATCU 7 determines that the duration of driving is less than the maximum duration of driving Dmax, the operation returns to step S20, in which ATCU 7 controls brushless motor 6 in the aforementioned way. When ATCU 7 determines that the conditions for idle reduction permission are not met in step S22, idle reduction (step S24) is cancelled and brushless motor 6 is stopped (step S25). In this way, brushless motor 6 is kept driven either until the conditions for idle reduction permission are no longer met or until the duration of driving becomes not less than the maximum duration of driving Dmax.

Figure 4:
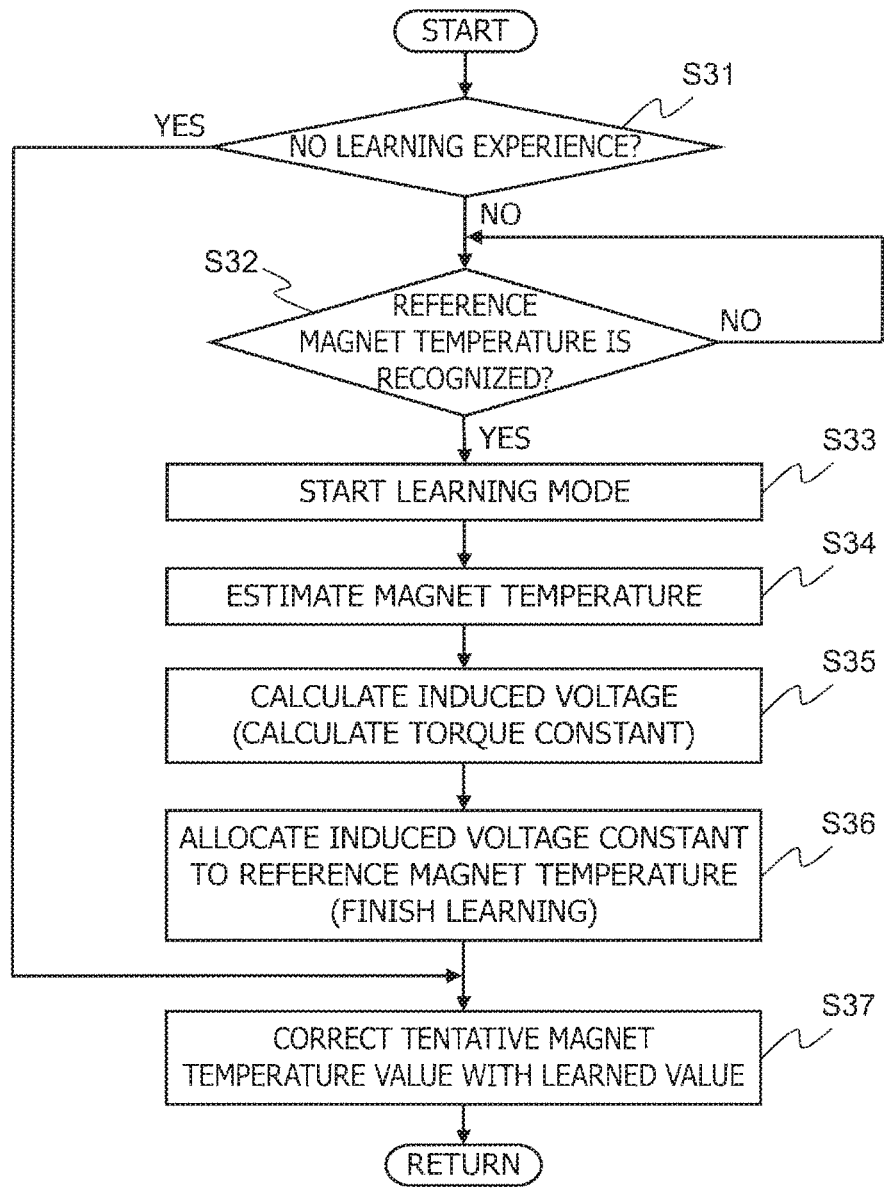
FIG. 4 is a flowchart illustrating a specific example of temperature correction operation in the flowchart of FIG. 2.

FIG. 4 illustrates a specific example of the temperature correction operation in step S13 of FIG. 2. ATCU 7 performs the temperature correction by correcting, with a learned value, the tentative magnet temperature value calculated in step S12 of FIG. 2. First, in step S31, ATCU 7 determines whether ATCU 7 has any learning experience. When determining that ATCU 7 has no learning experience, ATCU 7 determines whether ATCU 7 has recognized a reference magnet temperature (oil temperature) (step S32), and repeats this determination till recognizing the reference magnet temperature. On the other hand, when determining that ATCU 7 has any learning experience, ATCU 7 corrects the tentative magnet temperature value with the learned value that ATCU 7 previously stores therein (step S37). Then, the operation returns to step S13 in the flowchart of FIG. 2, and ATCU 7 definitively determines the magnet temperature (step S14).

When determining that ATCU 7 recognizes the reference magnet temperature in step S32, ATCU 7 starts a learning mode (step S34), and estimates the magnet temperature (step S34). The magnet temperature is estimated by the same method as in steps S11 and S12 in the flowchart of FIG. 2. Then, ATCU 7 calculates induced voltage (torque constant) in step S35. In the next step S36, ATCU 7 allocates the induced voltage constant to the reference magnet temperature, and thereby finishes learning. Thereafter, ATCU 7 corrects the tentative magnet temperature value with the calculated learned value (step S37), so that the operation returns to step S13 in the flowchart of FIG. 2. Then, ATCU 7 definitively determines the magnet temperature through calculation (step S14).

Figure 8A:
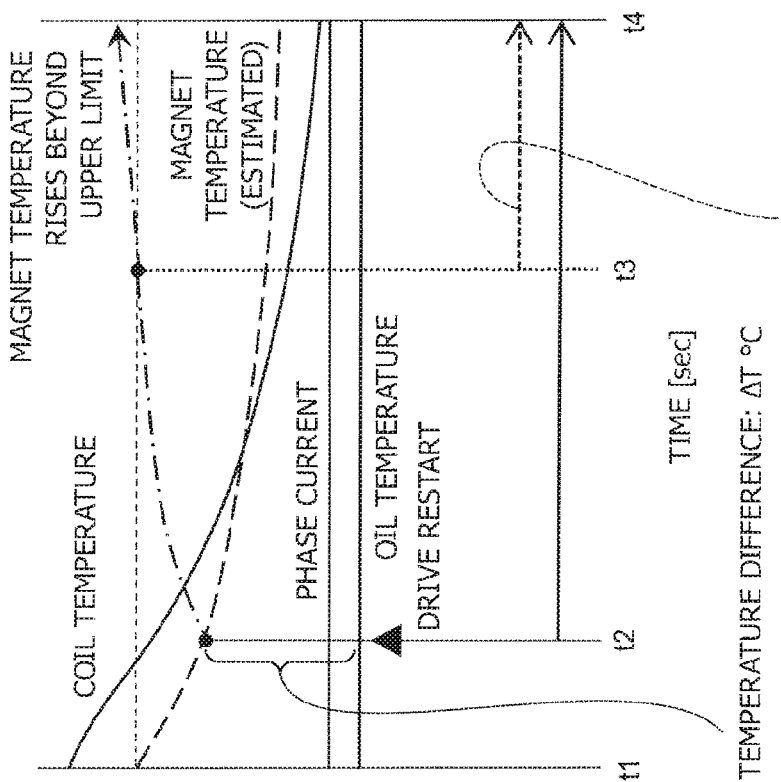
FIGS. 8A and 8B are characteristics charts displaying measurements of oil and coil temperatures and phase current as well as estimated values of the magnet temperature which are obtained when the initial value of the magnet temperature is set equal to the oil temperature measured at the time of estimation.
Figure 8B:
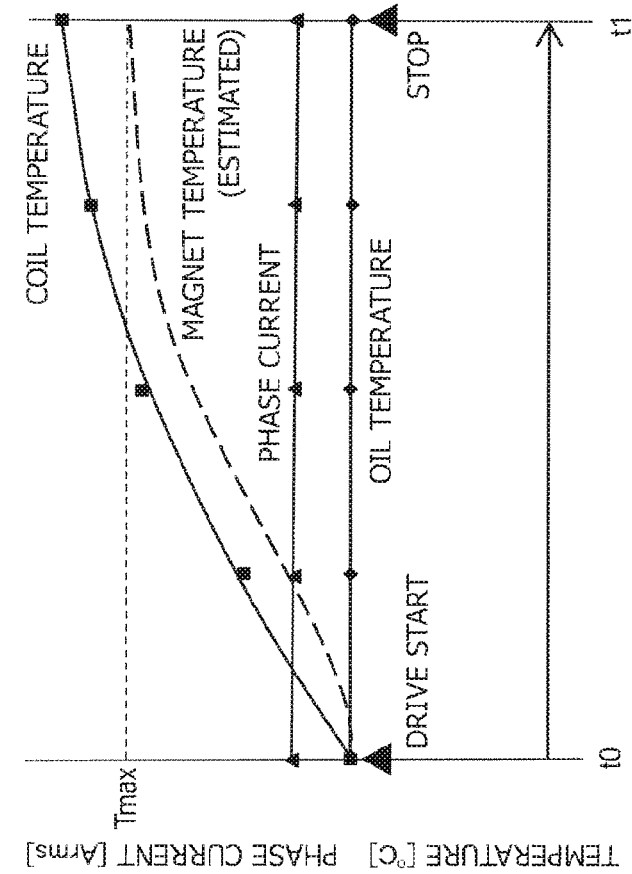
Figures 9A, 9B:
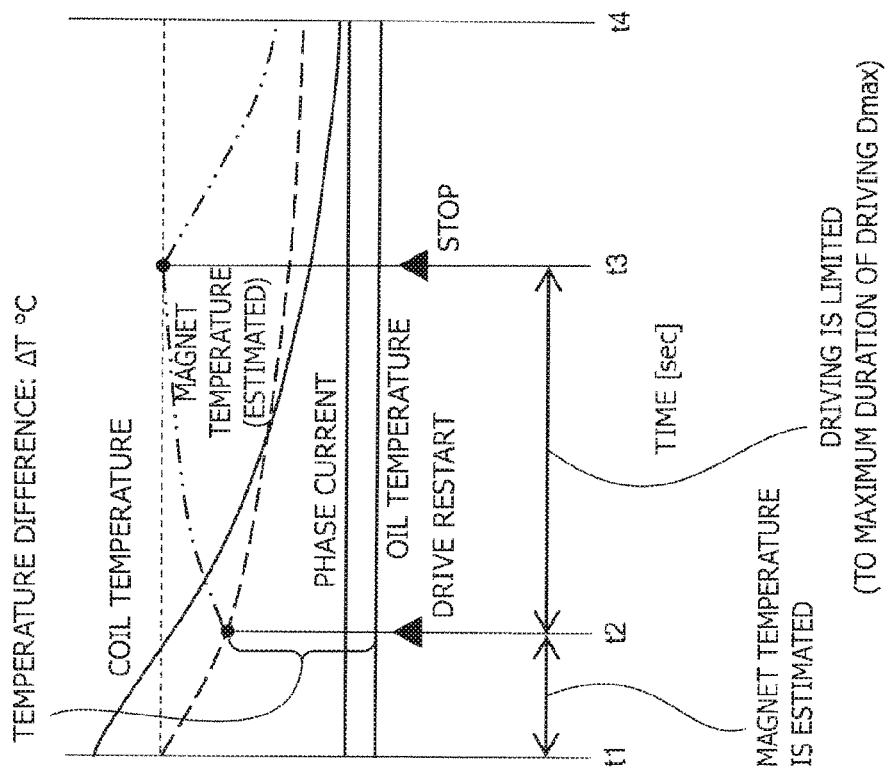
FIGS. 9A and 9B are characteristics charts displaying measurements of the oil and coil temperatures and phase current as well as estimated values of the magnet temperature which are obtained when the magnet temperature is estimated just before the restart of the drive of electric oil pump.

FIGS. 8A to 9B display measurements of the oil and coil temperatures and the phase current as well as estimated values of the magnet temperature. FIGS. 8A and 8B display these measurements and estimated values in the conventional technique (in which the initial value of the magnet temperature is set equal to oil temperature measured at the time of estimation). FIGS. 9A and 9B display these measurements and estimated values in this embodiment (in which the magnet temperature is estimated just before the restart of the drive of electric oil pump 4). FIGS. 8A and 9A each display characteristics of temperature rise while brushless motor 6 is being driven. FIGS. 8B and 9B each display characteristics of temperature fall and rise around the drive restart of brushless motor 6.

As displayed in FIG. 8A, at time point t0 when the drive of brushless motor 6 is started under the condition that engine 5 is cold, the magnet temperature is substantially equal to the oil temperature. However, as a predetermined phase current flows through the coil in brushless motor 6, the magnet temperature (estimated temperature) rises toward the allowable upper limit Tmax along with the rise in the coil temperature. Meanwhile, the oil temperature rises more slowly than the coil and magnet temperatures.

Then, the drive of brushless motor 6 stops at time point t1. As a result, the coil temperature and the magnet temperature (estimated temperature) gradually fall as displayed in FIG. 8B, and come closer to the oil temperature after a long period of time (after time point t4).

However, when the drive of brushless motor 6 is restarted at time point t2 when the temperature difference ΔT between the oil and magnet temperatures is still large, the magnet temperature starts rising again from the relatively high value. If kept driven, brushless motor 6 will be driven with the magnet temperature rising beyond the allowable upper limit Tmax as indicated by dashed-dotted line of FIG. 9A after time point t3. Such a condition will cause irreversible demagnetization in the rare earth magnet in brushless motor 6. This may degrade the performance of electric oil pump 4, which thus fails to provide sufficient oil pressure.

However, the magnet temperature can be prevented from rising beyond the allowable upper limit Tmax by limiting the drive of the brushless motor 6 with the control variable calculated using the magnet temperature estimated just before the restart of the drive of electric oil pump 4. As illustrated in FIG. 9A, the coil and oil temperatures and the magnet temperature (estimated temperature) changes in a similar manner as in FIG. 8A.

As displayed in FIG. 9B, the drive of brushless motor is restarted at time point t2 when the temperature difference ΔT between the oil and magnet temperatures is still large by the following method. First, the magnet temperature is estimated just before the restart of the drive of electric oil pump 4, and the control variable is calculated using this estimated magnet temperature. Based on this control variable, brushless motor 6 is driven continuously for not less than the maximum duration of driving Dmax. Thereby, idle reduction is cancelled at and after time point t3 to reduce the magnet temperature. As described above, limiting (reducing) the duration of driving brushless motor 6 based on the temperature difference ΔT recognized before the start of the drive of brushless motor 6 makes it possible to prevent the magnet temperature from rising beyond the allowable upper limit Tmax even if the drive of brushless motor 6 is restarted at the time point when the temperature difference ΔT is relatively large.

Figure 10A:
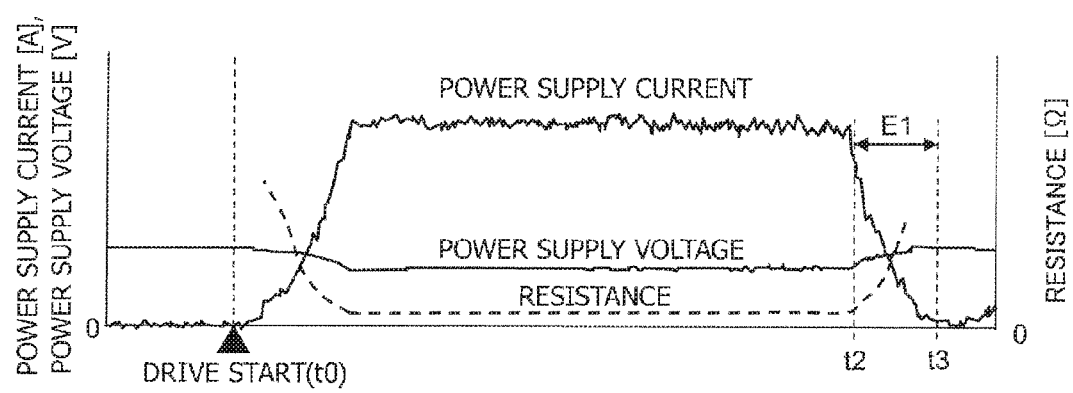
FIGS. 10A to 10C are charts displaying operating waveforms of the brushless motor driven in forward rotation.
Figure 10B:
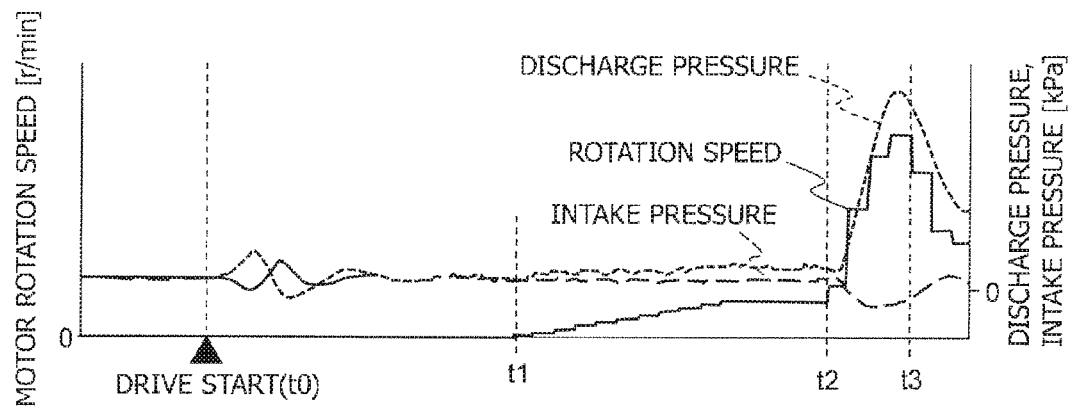
Figure 10C:
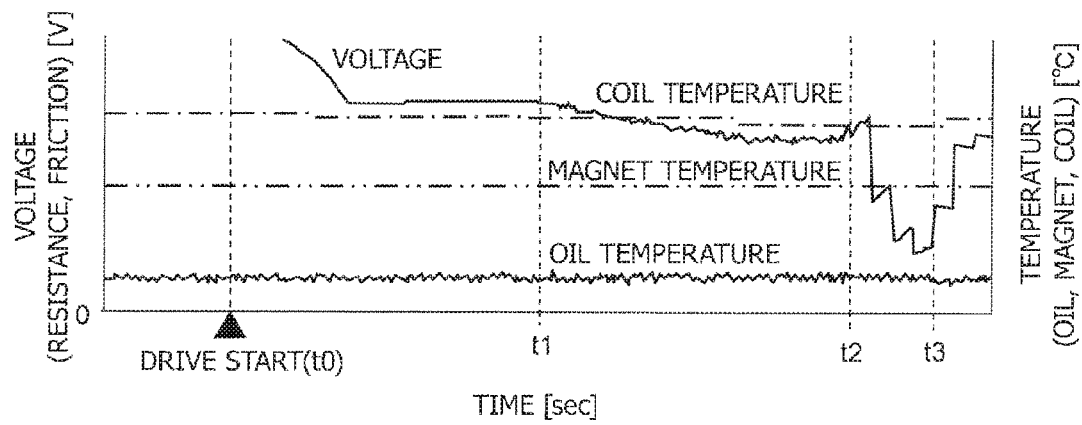
Figure 11A:
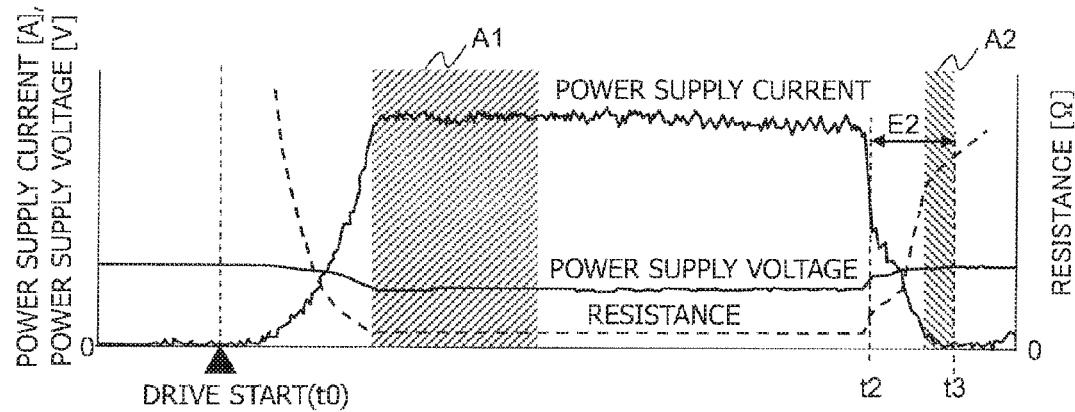
FIGS. 11A to 11C are charts displaying operating waveforms of the brushless motor driven in reverse rotation.
Figure 11B:
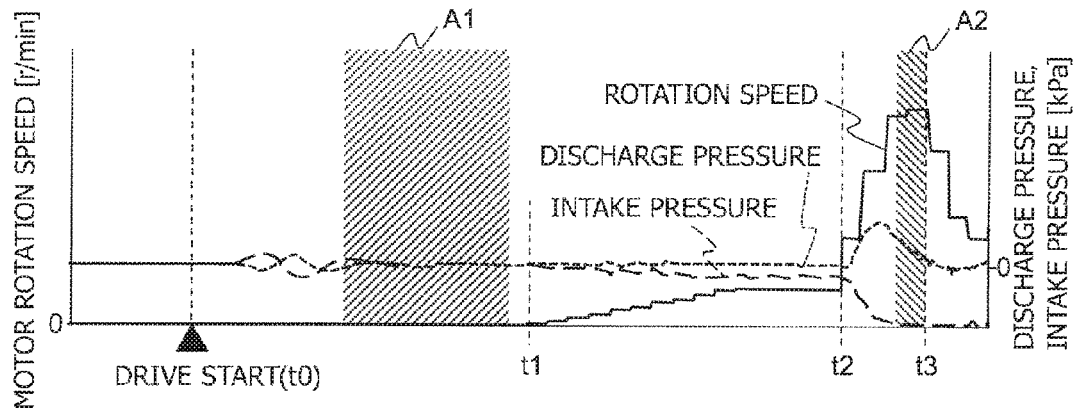
Figure 11C:
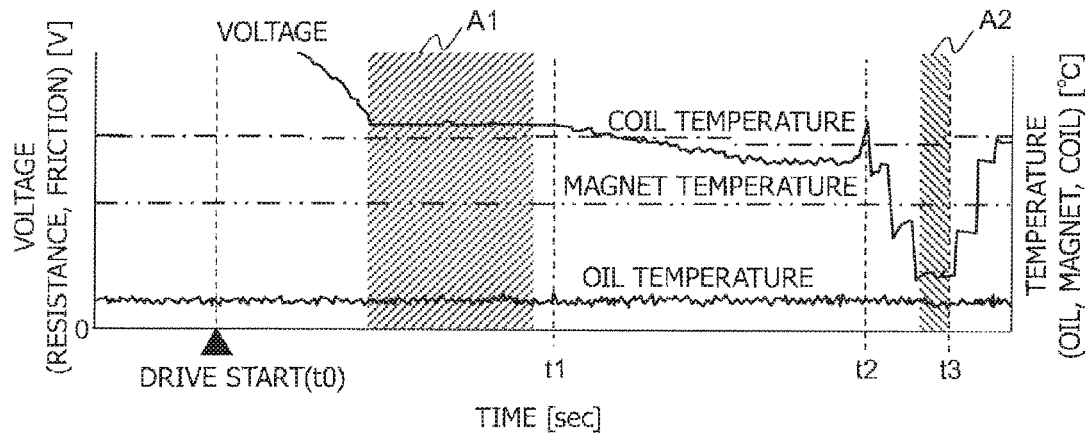

FIGS. 10A to 10C display operating waveforms of brushless motor 6 driven in forward rotation. FIGS. 11A to 11C display operating waveforms of brushless motor 6 driven in reverse rotation. Each of the operating waveforms in FIG. 11 is observed during the operation in step S3 to S8 in the flowchart of FIG. 2.

FIGS. 10A and 11A each display the relation between the power supply voltage, the power supply current and the resistance in brushless motor 6. FIGS. 10B and 11B each display the relation between the rotation speed of brushless motor 6 and the intake and discharge pressures of electric oil pump 4. FIGS. 10C and 11C each display the relation between the voltage (resistance and friction) and the coil, magnet and oil temperatures.

As displayed in FIG. 10A, when brushless motor 6 is driven to rotate in the forward direction (at time point t0), the power supply current increases sharply to stay at a predetermined value, and decreases sharply from time point t2 to stay at approximately zero after time point t3. The power supply voltage temporarily decreases while the power supply current flows through brushless motor 6.

As displayed in FIG. 10B, brushless motor 6 starts to rotate at time point t1 behind the drive start (t0). The rotation speed of brushless motor 6 increases sharply from time point t2 to reach its peak at time point t3, and decreases after that. The discharge pressure of electric oil pump 4 changes substantially along with the increase and decrease in the rotation speed of brushless motor 6. The intake pressure changes inversely with and smaller in level than the discharge pressure.

As displayed in FIG. 10C, in a short period of time from the drive start of brushless motor 6, the oil, magnet and coil temperatures remain substantially unchanged while the voltage (resistance and friction) decreases as the value of the current increases so as to produce a waveform being a substantially inversion of the waveform of motor rotation speed.

In contrast, as displayed in FIG. 11A, when brushless motor 6 is driven to rotate in the reverse direction (at time point t0), the power supply current increases sharply to stay at a predetermined value, and decreases sharply from time point t2 to stay at approximately zero after time point t3 similarly to during forward rotation. The power supply voltage temporarily decreases while the power supply current flows through brushless motor 6.

As displayed in FIG. 11B, brushless motor 6 starts to rotate at time point t1 behind the drive start (at t0). The rotation speed of brushless motor 6 increases sharply from time point t2 to reach its peak at time point t3, and decreases after that. The discharge pressure of electric oil pump 4 temporally increases till the oil 2 is drained out of oil pipe 11a, but thereafter stays at approximately zero since electric oil pump 4 runs idle under the conditions. This allows brushless motor 6 to be driven at lower load than during forward rotation. While electric oil pump 4 runs idle, the intake pressure decreases to a negative value.

As displayed in FIG. 11C, in a short period of time from the drive start (t0) of brushless motor 6, the oil, magnet and coil temperatures remain substantially unchanged while the voltage (resistance and friction) decreases as the drive current increases so as to produce a waveform being a substantially inversion of the waveform of motor rotation speed.

As is clear from the comparison between FIGS. 10B and 11B as to the intake and discharge pressures of electric oil pump 4 in the period between time points t2 and t3, the energy E2 consumed by brushless motor 6 during reverse rotation is lower than the energy E1 consumed during forward rotation. This is because the energy E1 consumed by brushless motor 6 during forward rotation is determined by the induced voltage, the work done during discharge, the friction and energy consumption of the electric resistance, but the energy E2 consumed during reverse rotation is determined by less factors since the work done during discharge is not required to be factored in. This also eliminates the need for considering parameters for the work done during discharge, thus reducing the calculation load on ATCU 7.

In the waveform chart of FIG. 11, the resistance is calculated from the current and voltage supplied to brushless motor 6 in area A1 shaded with right-down diagonal lines, and the magnet temperature is estimated based on the saturation rotation speed of brushless motor 6 in area A2 shaded with left-down diagonal lines.

As described above, according to this embodiment, ATCU 7 estimates the magnet temperature when determining, on the basis of the driving status of the vehicle, that a drive request for electric oil pump 4 (for idle reduction or the like) is expected. In other words, ATCU 7 estimates the magnet temperature at timing before the drive request for brushless motor 6 is issued when no idle reduction request is issued. Specifically, ATCU 7 estimates the magnet temperature based on the saturation rotation speed and the phase current value during saturation rotation while rotationally controlling brushless motor 6 by applying thereto a set voltage calculated from the resistance of brushless motor 6 that is calculated during its positioning control. While estimating the magnet temperature, ATCU 7 rotates brushless motor 6 in the reverse direction.

Upon receipt of the command to drive electric oil pump 4 from ATCU 7, the actuator controller drives electric oil pump 4 for a duration of driving set according to temperature characteristics when heated (characteristics of temperature rise) of the magnet on the basis of the estimate magnet temperature, the command to drive electric oil pump 4 and the oil pressure. This duration of driving is set not less than a period of time required to electric oil pump 4 to have a predetermined discharge pressure.

After the duration of driving set based on the control variable, electric oil pump 4 is stopped. In an idle reduction system, for example, ATCU 7 transmits the idle reduction cancel signal ISS to ECU 10, which is the higher-level unit of ATCU 7, before electric oil pump 4 stops. The transmission timing of the idle reduction cancel signal ISS is set to a time point behind when the discharge pressure of mechanical oil pump 3 reaches to a predetermined oil pressure after idle reduction is cancelled. This makes it possible to prevent the oil pressure from decreasing when idle reduction is cancelled.

In the configuration and control operation as described above, the duration of driving an electric oil pump is set based on the magnet temperature estimated just before the drive request of the electric oil pump is issued. This prevents the electric oil pump from being continued to be driven even after the temperature of the magnet in the brushless motor rises beyond the allowable maximum temperature. As a result, demagnetization of the magnet, which degrades the performance of the electric oil pump so that the electric oil pump fails to provide sufficient oil pressure, is prevented. In addition, in the configuration and control operation as described above, the magnet temperature is estimated just before the start of the drive of the electric oil pump. This allows the electric oil pump to be driven till the magnet temperature reaches its allowable maximum temperature. Moreover, the duration of driving can be extended if there is a much time before the magnet temperature reaches the allowable maximum temperature. Furthermore, in an idle reduction system, the brushless motor may be rotated in the reverse direction so that the electric oil pump runs idle while the magnet temperature is estimated. This reduces power consumption (heat generation) by the brushless motor.

Estimating the magnet temperature based on temperature-torque characteristics of the brushless motor and limiting the control variable based on demagnetization characteristics of the magnet as described above allows the current flowing through the brushless motor to be limited. Thereby, the magnet temperature can be estimated according to the actual temperature thereof without providing any temperature sensor. As a result, performance degradation due to demagnetization of brushless motor or insufficient oil pressure can be prevented. Moreover, the temperature correction value is learned and stored to be used to correct the control variable for limiting current supplied to the brushless motor, Thereby, errors in estimated temperature can be reduced.

Accordingly, the electric oil pump can be prevented from being kept driven even after the temperature of the magnet in the brushless motor rises beyond the allowable maximum temperature. In other words, the brushless motor can be appropriately driven without providing any temperature sensor thereto.

[Modification 1]

Note that the present invention is not limited to the above embodiment but may be variously modified or changed. For example, in the above embodiment, the transmission oil pump system is described as an example of an actuator for driving vehicle accessories. However, the present invention may be applied also to any other various devices that control an actuator driven by a brushless motor using a rare earth magnet. Note also that, though the above embodiment is an application to idle reduction, the application of the present invention is not limited to idle reduction.

[Modification 2]

In the flowchart of FIG. 2, the magnet temperature is estimated at the timing before the drive request for brushless motor 6 is issued. However, the magnet temperature does not have to be estimated each time before the drive request. Alternatively, the magnet temperature may be estimated at different timing such as after brushless motor 6 is rotated for a predetermined period of time, or brushless motor 6 continues to operate for a predetermined control variable. Still alternatively, the magnet temperature may be estimated at predetermined timing set by combining these timing points, though obvious.

[Modification 3]

After step S8 in flowchart of FIG. 2, brushless motor 6 may be driven in forward rotation to fill oil pipe 11a with the oil 2. Filling oil pipe 11a with the oil 2 allows for earlier initial rise of oil pressure in the forward rotation control mode during idle reduction.

[Modification 4]

The above embodiment describes an example in which the tentative magnet temperature value calculated in step S12 of FIG. 2 is corrected with the learned value in step S13. Alternatively, the tentative magnet temperature value may be corrected with correction data previously stored in a map, a table or the like. Still alternatively, the operation in step S13 may be omitted by providing a safety margin to the calculated tentative magnet temperature value. Still alternatively, the learned value may be updated at predetermined timing.

[Modification 5]

In the above embodiment, the magnet temperature is estimated according to the electric current value and the rotation speed of the brushless motor when power is supplied thereto. Alternatively, the magnet temperature may be estimated by using the voltage or the pulse width in place of the current, and/or by using a value such as time for switching the power supply to brushless motor 6 in place of the rotation speed thereof.

[Modification 6]

The above embodiment describes an example in which the magnet temperature is estimated while brushless motor 6 is rotated in the reverse direction. However, the magnet temperature may alternatively be estimated while brushless motor 6 is rotated in the forward direction. In this case, the load for causing the actuator to operate should preferably be sufficiently reduced.

REFERENCE SYMBOL LIST

1 Oil pan
2 Oil
3 Mechanical oil pump
4 Electric oil pump
5 Engine
6 Brushless motor
7 ATCU (controller)
8 Inverter
10 ECU
11A to 11C Oil pipe
12 and 13 Check valve

The invention claimed is:

1. A controller for an actuator that is driven by a brushless motor for driving an electric oil pump, wherein, according to a temperature of a magnet in the brushless motor estimated on the basis of a saturation rotation speed and a phase current value during saturation rotation of the brushless motor which are obtained by supplying power thereto while the electric oil pump is caused to run idle with oil drained out of an oil pipe by rotating the brushless motor in a direction reversal of a rotational direction thereof for driving the actuator, the actuator controller limits current flowing through the brushless motor while the brushless motor is driving the actuator.

2. The actuator controller according to claim 1, wherein the actuator controller limits the current flowing through the brushless motor first by calculating the temperature of the magnet in the brushless motor on the basis of temperature-torque characteristics thereof, and then by limiting a control variable in accordance with the calculated temperature and demagnetization characteristics of the magnet.

3. The actuator controller according to claim 2, wherein the temperature of the magnet is calculated at at least one of time points of: just before a drive request for the brushless motor is issued, just after the brushless motor is rotated for a predetermined time period, and just after the brushless motor operates for a predetermined control variable.

4. The actuator controller according to claim 2, wherein the actuator controller corrects, on the basis of a learned value, the temperature of the magnet calculated as a tentative value.

5. The actuator controller according to claim 2, wherein
the control variable corresponds to a duration of driving the brushless motor, and
the actuator controller limits the current flowing through the brushless motor by stopping driving the brushless motor.

6. The actuator controller according to claim 1, wherein the actuator is for driving an accessory of a vehicle, and stops limiting the current flowing through the brushless motor in response to a request from the vehicle.

7. A method for controlling an actuator that is driven by a brushless motor for driving an electric oil pump, comprising the steps of:
rotating the brushless motor in a direction reversal of a rotational direction thereof for driving the actuator;
supplying power to the brushless motor while the electric oil pump is running idle with oil drained out of an oil pipe; and
limiting current flowing through the brushless motor while the brushless motor is driving the actuator, according to a temperature of a magnet in the brushless motor estimated on the basis of a saturation rotation speed and a phase current value during saturation rotation of the brushless motor which are obtained by performing the step of supplying power.

8. The actuator control method according to claim 7, wherein the step of limiting the current includes the steps of:
calculating the temperature of the magnet in the brushless motor on the basis of temperature-torque characteristics thereof; and
limiting a control variable in accordance with the calculated temperature and demagnetization characteristics of the magnet.

9. The actuator control method according to claim 8, wherein the step of calculating the temperature of the magnet is carried out at least one of time points of: just before a drive request for the brushless motor is issued, just after the brushless motor is rotated for a predetermined time period, and just after the brushless motor operates for a predetermined control variable.

10. The actuator control method according to claim 8, further comprising the step of correcting, on the basis of a learned value, the temperature of the magnet calculated as a tentative value.

11. The actuator control method according to claim 10, wherein the learned value is updated at predetermined timing.

12. The actuator control method according to claim 8, wherein
the control variable corresponds to a duration of driving the brushless motor, and
the actuator controller limits the current flowing through the brushless motor by stopping driving the brushless motor.

13. The actuator control method according to claim 7, further comprising the steps of:
learning and storing a temperature correction value; and
correcting, with the stored temperature correction value, a control variable for limiting the current flowing through the brushless motor.

14. The actuator control method according to claim 7, wherein the actuator is for driving an accessory of a vehicle, and the step of limiting the current is carried out in response to a request from the vehicle.

* * * * *